(12) United States Patent
Arnold

(10) Patent No.: US 6,899,090 B2
(45) Date of Patent: May 31, 2005

(54) DUAL PATH EGR SYSTEM AND METHODS

(75) Inventor: Steven Don Arnold, Rancho Palos Verdes, CA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/647,045

(22) Filed: Aug. 21, 2003

(65) Prior Publication Data

US 2004/0050375 A1 Mar. 18, 2004

Related U.S. Application Data

(60) Provisional application No. 60/404,955, filed on Aug. 21, 2002.

(51) Int. Cl.[7] ............................................. F02M 25/07
(52) U.S. Cl. ............................. 123/568.12; 123/568.2; 60/605.2
(58) Field of Search .................... 123/568.11, 568.12, 123/568.17, 568.18, 568.2; 60/602, 605.2, 608

(56) References Cited

U.S. PATENT DOCUMENTS

| | | | |
|---|---|---|---|
| 4,215,550 A | * | 8/1980 | Dinger et al. ............... 60/605.2 |
| 5,203,311 A | * | 4/1993 | Hitomi et al. .............. 60/605.2 |
| 5,740,785 A | | 4/1998 | Dickey et al. |
| 5,771,868 A | | 6/1998 | Khair |
| 5,806,308 A | * | 9/1998 | Khair et al. ............ 123/568.12 |
| 5,908,022 A | | 6/1999 | Aoki et al. |
| 5,927,075 A | * | 7/1999 | Khair ........................ 60/605.2 |
| 5,937,650 A | | 8/1999 | Arnold |
| 6,003,316 A | | 12/1999 | Baert et al. |
| 6,062,026 A | | 5/2000 | Woollenweber et al. |
| 6,269,642 B1 | | 8/2001 | Arnold et al. |
| 6,301,888 B1 | * | 10/2001 | Gray, Jr. .................... 60/605.2 |
| 6,338,245 B1 | | 1/2002 | Shimoda et al. |
| 6,360,541 B2 | * | 3/2002 | Waszkiewicz et al. ..... 60/605.2 |
| 6,386,154 B1 | | 5/2002 | Hellman et al. |
| 6,422,220 B1 | | 7/2002 | Lepp et al. |
| 6,470,864 B2 | | 10/2002 | Kim et al. |
| 6,742,506 B1 | * | 6/2004 | Grandin ................. 123/568.12 |
| 2001/0035171 A1 | | 11/2001 | Kim et al. |
| 2002/0073979 A1 | | 6/2002 | Lepp et al. |
| 2002/0112478 A1 | | 8/2002 | Pfluger |
| 2003/0145591 A1 | | 8/2003 | Arnold |

FOREIGN PATENT DOCUMENTS

DE          019514572 A1      10/1996

* cited by examiner

Primary Examiner—Willis R. Wolfe, Jr.
(74) Attorney, Agent, or Firm—Ephraim Starr; Chris James

(57) ABSTRACT

An internal combustion engine system, dual loop EGR system and method is provided, with a high pressure EGR loop, controlled by a control valve, in fluidic connection with the exhaust outlet of the exhaust manifold and the air inlet of the intake manifold, and a low pressure EGR loop, wherein exhaust, in proportions controlled by a control valve, enters a compressor from a point downstream of an exhaust emissions controller, together with fresh air, the low pressure EGR loop being in fluidic connection with an output of the compressor and the air inlet of the intake manifold.

17 Claims, 2 Drawing Sheets

DUAL PATH EGR SYSTEM AND METHODS

CROSS-REFERENCE TO RELATED APPLICATIONS

This application claims the benefit of the filing of U.S. Provisional Patent Application Ser. No. 60/404,955, entitled "Dual EGR Concept", filed on Aug. 21, 2002, and the specification thereof is incorporated herein by reference.

BACKGROUND OF THE INVENTION

1. Field of the Invention (Technical Field)

The present invention relates to the field of internal combustion engine exhaust gas recirculation (EGR) for emissions improvement and increased operating efficiency, including increased fuel economy. More particularly, the invention provides a system and method for dual path EGR, utilizing a high pressure EGR loop, primarily for use under mid and high load engine conditions, and a low pressure EGR loop, combining turbocharger compressed exhaust gas and fresh air, primarily for use under low load engine conditions.

2. Description of Related Art

EGR is a known method for reducing NOx emissions in internal combustion engines, particularly diesel engines. For effective use, an EGR system must be matched to the engine load setting and environmental conditions. High pressure loop EGR, providing a loop from the exhaust manifold of the engine to the intake manifold, optionally with an EGR cooler, works well for high power or load settings and modest EGR rates. However, at low load settings the comparatively high EGR rates result in undesirably high back pressures, resulting in a significant fuel consumption penalty.

Low pressure loop EGR typically takes exhaust gas from the exhaust, downstream of particulate traps and other emissions control devices, and injects the exhaust gas into the compressor, delivering compressed exhaust gas, typically mixed with fresh air, to the intake manifold of the engine. Low pressure loop EGR works well at low power or load settings. At high EGR rates low pressure loop EGR typically incurs some operational penalties, in that the balance of EGR to fresh air is such as to not provide optimal emissions control. However, at high power or load settings low pressure loop EGR incurs a very large fuel penalty, due to the need for flow ranges outside the capabilities of turbine-driven compressors, a poor turbine-to-compressor flow match and excessive heat loads.

It is also known that environmental conditions can affect the operation and efficiency of EGR systems. Specifically, in cold weather condensation is a significant issue with EGR systems, particularly high pressure loop EGR. Condensation in cold weather, typically caused by operation of the EGR cooler, results in introduction of water into the intake manifold of the engine, causing production of acids, including sulfuric and nitric acids, soot formation, and the like, all of which degrade engine life and performance.

It is known to introduce only fresh air to the inlet of an engine, typically air compressed by use of a turbine compressor. However, with use of fresh air only the benefits, including the emission control benefits, resulting from use of EGR are lost. In some systems, high pressure loop EGR is employed in combination with compressed fresh air. However, these systems still result in undesirable emission levels at low power or load settings, and are susceptible to decreased efficiency and fuel consumption penalties.

It is, therefore, desirable to provide an EGR system, and methods for such systems, which provide optimal fuel and emissions controls over a wide range of power or load settings. In many applications, including diesel engines for vehicles, the power or load setting varies over a wide range, from very low loads while the vehicle is at idle to very high loads while the vehicle is accelerating or climbing an incline. In such applications a wide range of environmental operating conditions are typically encountered, with ambient air temperatures ranging from well below 0° C. to over 40° C. It is further desirable to provide an EGR system, and methods for such systems, which provide the benefits associated with high pressure EGR loop systems, without incurring the penalties associated with such systems, and which further provide the benefits associated with low pressure EGR loop systems, again without incurring the penalties associated with such systems.

BRIEF SUMMARY OF THE INVENTION

The invention provides an internal combustion engine system with a dual path EGR system, the dual path EGR including a high pressure EGR loop and a low pressure EGR loop, means for switching between the two loops, and preferably means for controlling based on one or more operating parameters of the internal combustion engine system. The system includes an engine with an exhaust manifold with an exhaust outlet and an intake manifold with an air inlet. An engine exhaust conduit is in fluidic connection with the exhaust outlet and the inlet of a first control valve with one inlet and two outlets. The high pressure EGR loop, optionally including an EGR cooler, is in fluidic connection between a first outlet of the first control valve and the air inlet of the intake manifold. The system further includes a turbocharger, preferably a variable geometry turbocharger, with an exhaust gas turbine with an input in fluidic connection with a second outlet of the first control valve and with an output, the turbocharger further having a compressor with an input and an output. An emissions controller with an input and output is provided, the input of the emissions controller being in fluidic connection with the output of the exhaust gas turbine. A low pressure EGR supply conduit is in fluidic connection with the output of the emissions controller and a fresh air inlet in fluidic connection with the input of the compressor, with a second control valve disposed along the low pressure EGR supply conduit. An intake manifold conduit, optionally with an air cooler, is in fluidic connection between the output of the compressor and the air inlet of the intake manifold. The engine system optionally and preferably includes a control, the control operating the first control valve and the second control valve to determine whether exhaust gas will enter the air inlet of the intake manifold by means of the high pressure EGR loop or by means of the intake manifold conduit, or both.

In another embodiment, the invention provides a dual loop EGR system adapted for use with an internal combustion engine, the engine having an exhaust manifold including an exhaust outlet and an intake manifold including an air inlet. In the dual loop EGR system there is provided a high pressure EGR loop in fluidic connection with the exhaust outlet of the exhaust manifold and the air inlet of the intake manifold, a turbocharger, in a preferred embodiment a variable geometry turbocharger, including an exhaust gas turbine and a compressor with an input and an output, an exhaust emissions controller downstream of the exhaust gas turbine, with a first portion of a low pressure EGR loop in fluidic connection with the exhaust emissions controller and the input of the compressor, and a second portion of a low pressure EGR loop in fluidic connection with the output of the compressor and the air inlet of the intake manifold. The dual loop EGR system may further include a first control valve for controlling flow of exhaust through the high pressure EGR loop and a second control valve for controlling flow of exhaust through the first portion of the low pressure EGR loop. In a preferred embodiment, an EGR cooler is disposed along the high pressure EGR loop, and independently an air cooler is disposed along the second portion of the low pressure EGR loop. The dual loop EGR system may further include a control, the control operating the first control valve and the second control valve.

The invention further provides a method for controlling EGR in an internal combustion engine with an exhaust manifold including an exhaust outlet and an intake manifold including an air inlet, the method including providing a high pressure EGR loop with an EGR cooler and a first control valve, the high pressure EGR loop being in fluidic connection with the exhaust outlet of the exhaust manifold and the air inlet of the intake manifold, providing a turbocharger including an exhaust gas turbine with an exhaust emissions controller downstream of the turbine and a compressor with an input and an output, providing a first portion of a low pressure EGR loop with a second control valve in fluidic connection with the exhaust emissions controller and the input of the compressor and a second portion of a low pressure EGR loop in fluidic connection with the output of the compressor and the air inlet of the intake manifold, and controlling the first control valve and the second control valve such that the EGR source is the high pressure EGR loop, the low pressure EGR loop, or a combination thereof. In the method, under low engine load conditions the primary source of EGR is the low pressure EGR loop and under high engine load conditions the primary source of EGR is the high pressure EGR loop. The method can further provide for decreasing condensation within the engine under condensation conditions, such as low ambient air temperature, by maintaining the low pressure EGR loop as the primary source of EGR at up to moderate engine load conditions.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
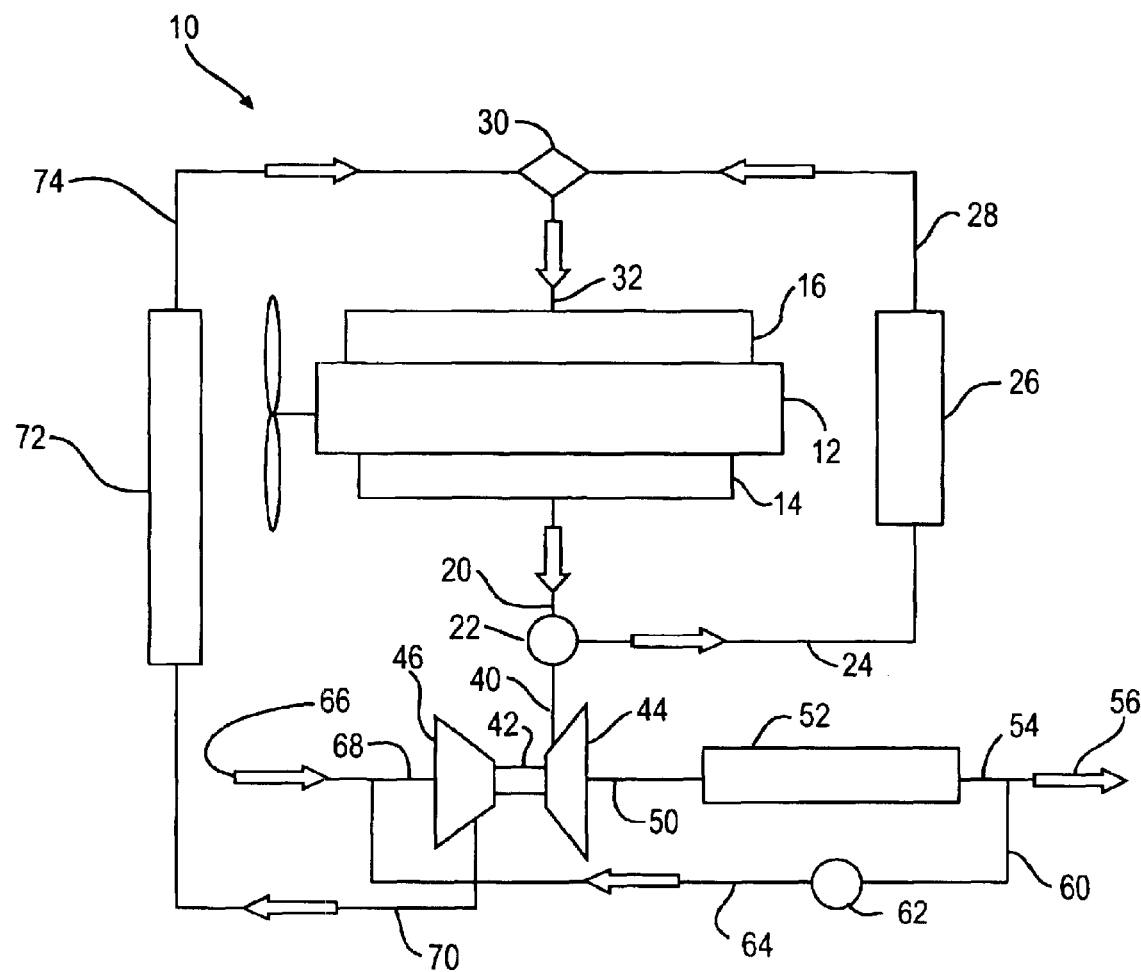
FIG. 1 is a schematic diagram of an engine and EGR system employing the combination and components of the present invention.

Referring to the drawings, FIG. 1 shows an internal combustion engine system 10 including the dual path EGR system of this invention. Internal combustion engine 12 has at least one cylinder in communication with exhaust manifold 14 and intake manifold 16. Exhaust manifold 14 is connected to exhaust line 20 which in turn is connected to first control valve 22, which controls the amount of exhaust gas entering high pressure EGR loop line 24. Preferably, first control valve 22 can be controlled such that the amount of exhaust gas entering line 24 can range from a predetermined maximum to no exhaust gas. Exhaust line 24 is connected to EGR cooler 26, and high pressure EGR loop line 28 connects the outlet of EGR cooler 26 to a first inlet on EGR mixer 30.

Exhaust gas not diverted to high pressure EGR loop line 24 by first control valve 22 is directed by means of exhaust turbine inlet line 40 to exhaust turbine 44, which exhaust turbine 44 forms a part of turbocharger 42. Exhaust gas entering exhaust turbine 44 produces rotational energy, thereby driving compressor 46. Exhaust gas exits turbine 44 by means of exhaust line 50, which is connected to emissions controller 52. Emissions controller 52 includes, in the case of a diesel engine, at least a diesel particulate filter, and optionally further includes one or more of a diesel oxidation catalyst, a lean NOx trap, and a selective catalytic reduction catalyst. Exhaust gas exits emissions controller 52 by means of exhaust line 54, which interconnects with and is in fluidic connection with exhaust gas compressor inlet line 60. Exhaust gas not diverted to exhaust gas compressor inlet line 60 is permitted to exit the engine system 10 by means of exhaust 56.

Exhaust gas diverted to exhaust gas compressor inlet line 60 is controlled by second control valve 62 disposed along line 60. Second control valve 62 controls the amount of exhaust gas diverted from the exhaust, with the diversion at a point downstream of emissions controller 52. As with first control valve 22, preferably second control valve 62 can be controlled such that the amount of exhaust gas passing through second control valve 62 can range from a predetermined maximum to no exhaust gas. Second control valve 62 is connected, on the outlet side, to exhaust gas compressor inlet line 64, which interconnects with and is in fluidic connection with compressor air inlet line 68. Air inlet line 68 is connected to a source of fresh air by means of inlet 66, it being understood that inlet 66 may further comprise air filters and similar structures. Fresh air enters compressor 46, driven by turbine 44, together with the amount of exhaust gas introduced through exhaust gas compressor inlet line 64, it being understood that quantity of exhaust gas is controlled by second control valve 62. In practice, the amount of exhaust gas, as a percentage of total intake to compressor 46, can range from 0% to about 50%. When the low pressure EGR loop is the sole or primary source of intake gas to intake manifold 16, the amount of exhaust gas, as a percentage of total intake to compressor 46, can range from about 5% to about 50%.

Compressor 46 compresses the mixture of fresh air and exhaust gas entering by means of air inlet line 68, with the compressed gas exiting compressor 46 by means of an intake manifold conduit, low pressure EGR loop line 70. Line 70 is in turn in fluidic connection with air cooler 72, optionally provided, with the gas exiting air cooler 72 by means of low pressure EGR loop line 74. Line 74 is connected to a second inlet on EGR mixer 30. EGR mixer 30 permits the gas entering by means of line 74 and line 28 to be mixed prior to entry into the engine by means of inlet line 32, connected to the outlet of EGR mixer 30 and to an inlet port of intake manifold 16. EGR mixer 30 further optionally comprises a proportioning gas control valve, to mix controlled proportions of the combined compressed air and exhaust gas from low pressure EGR loop line 70 with exhaust gas from high pressure EGR loop line 28, or, if second control valve 62 is closed, to mix controlled proportions of compressed air from line 70 with exhaust gas from high pressure EGR loop line 28.

Turbocharger 42 is optionally and preferably a variable geometry turbocharger, most preferably the variable geometry turbocharger as disclosed in commonly owned U.S. Pat. No. 6,269,642, issued Aug. 7, 2001, and incorporated herein by reference. The preferred variable geometry turbocharger permits the vanes of turbine to be actuated by a hydraulic actuator, such that the efficiency or operational range of the turbine 44 can be varied during operation, thereby providing for optimal system efficiency, particularly when the low pressure EGR loop is delivering compressed exhaust gas to intake manifold 16. It is to be understood that the invention is not limited to the variable geometry turbocharger of U.S. Pat. No. 6,269,642, and that other variable geometry turbochargers may be employed, and further that turbochargers not providing for variable geometry may be employed. However, a variable geometry turbocharger provides for increased system efficiencies and control of mass throughput not readily obtainable with standard turbochargers.

Where a variable geometry turbocharger is employed, optionally and preferably a variable geometry turbocharger control system is employed, most preferably the variable geometry turbocharger control system as disclosed in commonly owned U.S. patent application Ser. No. 2003/0145591, published Aug. 7, 2003, and incorporated herein by reference. Such a system can employ a variety of methods for optimizing efficiency of the turbocharger. Thus, for example, a conventional proportional integral differential technique can be employed to position an actuated vane, based on an error value, $err_{boost}$, calculated as the difference between a boost target determined from a boost target map and the actual boost. Alternatively, the desired actuated vane position may be determined by related methods, utilizing proportional integral differential techniques or modifications thereof, based on parameters relating to the vane position, proportional gain values, differential gain values, $err_{boost}$ values, turbo speeds, turbo speed targets, engine modes (idle, power or braking), and the like, as taught in application Ser. No. 2003/0145591.

Control valves 22 and 62 may incorporate aspects of the control valve disclosed in commonly owned U.S. Pat. No. 5,937,650, issued Aug. 17, 1999, incorporated herein by reference, and thus may incorporate a proportional electrical solenoid that acts on a three-way pneumatic or hydraulic valve with opposing force provided by a differential pressure generated by the flow through a separate exhaust gas recirculation valve. A control valve as disclosed in U.S. Pat. No. 5,937,650 is specially adapted for EGR control. In a preferred embodiment, control valves 22 and 62 are adapted for control by electrical means, such as by means of output signals from a microprocessor-based system. However, any of various electrical, mechanical or electromechanical control mechanisms can be used to control the valves. The valves are preferably controlled in response to one or more operating parameters of the engine 12 or engine system 10, in response to predetermined conditions or settings, or in response to operator provided instructions.

In a preferred embodiment, the internal combustion engine system 10 includes an engine control unit (ECU) (not shown). The ECU is in connection with one or more sensors (not shown) that monitor one or more operating parameters of engine 12 or engine system 10. Relevant operating parameters include, without limitation, the quantity of fuel flow to engine 12, the engine speed of engine 12, air flow at one or more points within engine system 10, turbine 44 speeds, compressor 46 pressure ratios, engine 12 operating temperatures at one or more locations, ambient environment or air temperatures and the like. The operating parameters sensed by the ECU are determined, in part, by the specific requirements of the ECU, and by data required for determining one or more output signals. It is to be understood and appreciated that less than all of the foregoing operating parameters may be utilized, and that in addition to the foregoing specified operating parameters, one or more additional operating parameters may be utilized. In a preferred embodiment, the ECU includes a microprocessor configured to receive signals from the sensors measuring engine system 10 or engine 12 operating parameters, and to perform one or more processes or calculations thereon, which processes or calculations may include comparison to maps or data stored in a memory component of the ECU. Based on one or more processes or calculations, or by comparison to predetermined conditions, the ECU can then provide an output signal, which output signal can control one or more of control valve 22, control valve 62, actuatable vanes or other components within turbocharger 42 where turbocharger 42 is a variable geometry turbocharger, and a proportioning gas control valve, if provided, of EGR mixer 30. In a preferred embodiment, the ECU provides an output signal to control both control valve 22 and control valve 62, more preferably to additionally control an operational component of turbocharger 42 where turbocharger 42 is a variable geometry turbocharger, and most preferably to further and additionally control a proportioning gas control valve of EGR mixer 30. It is to be understood and appreciated that the foregoing are the primary operating parameters and controls relating to the system and method for dual path EGR, as disclosed herein, utilizing a high pressure EGR loop and a low pressure EGR loop, and that the ECU may accept operating parameters, and may provide controls, for functions other than operation of the EGR system.

In operation, the ECU monitors operating parameters of engine 12 or engine system 10, and in response to detected parameters, provides one or more output signals to control valve 22 and control valve 62, and optionally to actuatable vanes or other components within turbocharger 42 wherein turbocharger 42 is a variable geometry turbocharger, and further optionally to a proportioning gas control valve, if provided, of EGR mixer 30. The engine 10 is preferably started with first control valve 22 positioned such that no exhaust gas enters high pressure EGR loop line 24. Second control valve 62 is in an open or partially opened position, such that exhaust gas, when generated, enters air compressor 46 by means of exhaust gas compressor inlet line 64. It is to be understood that while the foregoing is a preferred method of starting the engine, so as to minimize NOx emissions and maximize fuel economy, alternatives configurations may be employed in starting the engine. In low load operations, such as a truck diesel engine at an idle, it is preferable to continue operating engine 12 with first control valve 22 positioned such that no exhaust gas enters high pressure EGR loop line 24, and second control valve 62 is in an open or partially opened position, such that exhaust gas enters air compressor 46 by means of exhaust gas compressor inlet line 64. Under low load operations, generally very high EGR rates are required. The negative $\Delta p$ required to drive the EGR if a high pressure EGR loop were employed would result in a substantial fuel economy penalty. Use of the low pressure EGR loop minimizes the fuel economy penalty, and further allows very high EGR rates to be achieved. During moderate to high load operations, it is preferable to operate engine 12 with first control valve 22 positioned such that exhaust gas enters high pressure EGR loop line 24, transits EGR cooler 26, and enters intake manifold 16 by means of EGR mixer 30. Second control valve 62 is in a closed or partially closed position, such that little or no exhaust gas enters air compressor 46 by means of exhaust gas compressor inlet line 64. Thus under moderate or high load operations the high pressure EGR loop is utilized, which provides the best fuel economy and minimizes the boost pressure and heat load on the vehicle cooling system.

It may readily be seen that the system may operate in a binary fashion, such that EGR is provided by either the high pressure EGR loop or the low pressure EGR loop, or may be operated in a combination fashion, such that EGR is provided by both the high pressure EGR loop and the low pressure EGR loop. In one embodiment, the ECU is programmed such that there is a transition range between operation of the high pressure EGR loop and the low pressure EGR loop; for example, when transitioning from low load to moderate or high load conditions, second control valve 62 may be gradually closed, over some ascertained range or operating parameters, and first control valve 22 is gradually opened so as to allow increasing quantities of exhaust gas to enter high pressure EGR loop line 24.

Given that the low pressure EGR loop is only used during low load operations, an EGR cooler is not required for the low pressure EGR loop. Further, exhaust gas particulates and other noxious compounds that might impede the efficient and continued operation of compressor 46 are removed by emissions controller 52.

Under certain ambient environmental conditions, such as low temperature, condensation of EGR results from use of a high pressure EGR loop, and specifically primarily as a result of use of an EGR cooler, such as EGR cooler 26. The low pressure EGR loop of the present invention does not require or provide an EGR cooler, and accordingly there will be no or significantly reduced condensation in the low pressure EGR loop. Thus by using the low pressure EGR loop, substantially less water, with its resulting deleterious results, will enter intake manifold 16, as compared to the quantity of water that would enter under low temperature conditions utilizing the high pressure EGR loop and EGR cooler 26. It may thus be seen that the switching point between the low pressure EGR loop and the high pressure EGR loop may be adjusted, for example by delaying initiation of the high pressure EGR loop, under certain ambient environmental conditions, such as low temperature, until such power is generated that the exhaust is of sufficient temperature as to not be cooled below the dew point within the EGR cooler. In this embodiment, a desired operating parameter to be detected by the ECU includes ambient environment or air temperature, and one or more temperature sensors, including one or more sensors measuring air temperature at inlet 66, may be provided for this purpose.

Figure 2:
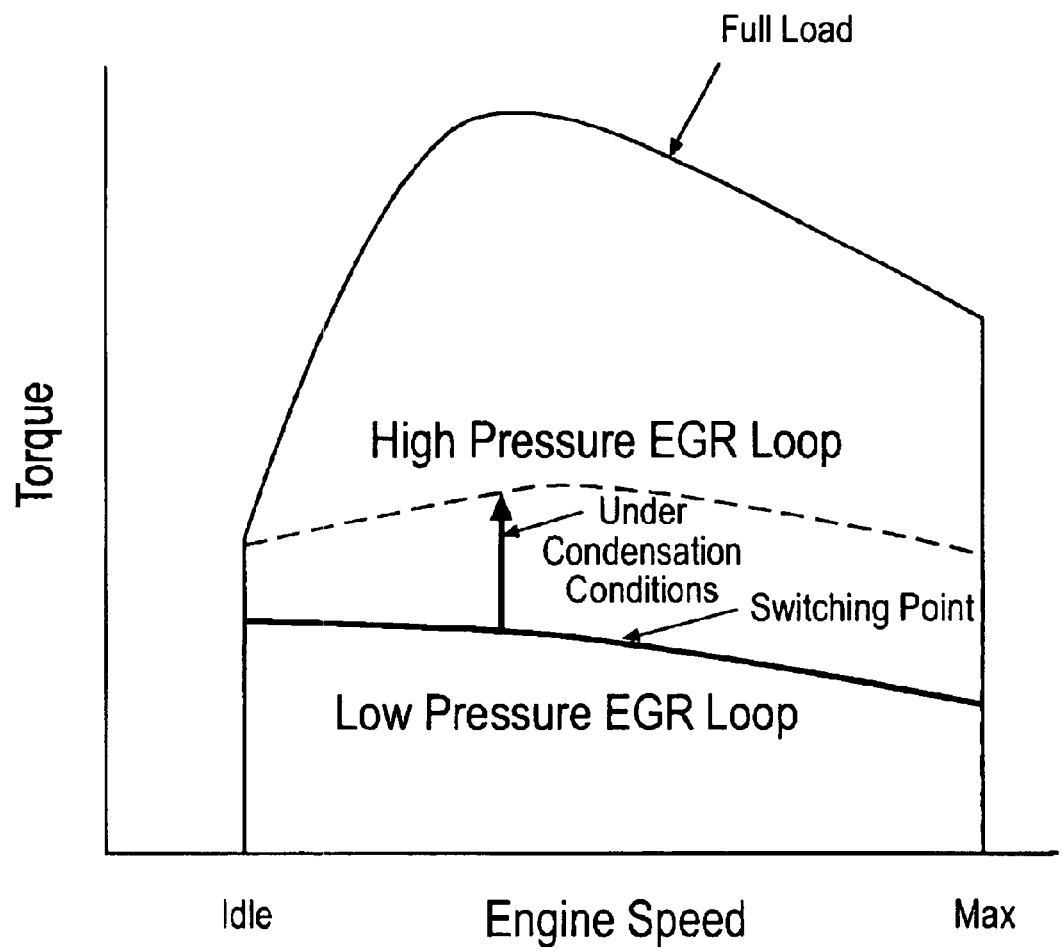
FIG. 2 is a graph illustrating usage of the dual path EGR system of the present invention.

FIG. 2 graphically depicts engine operating conditions under which the low pressure EGR loop or the high pressure EGR loop may be selected, such as for example by the ECU. FIG. 2 depicts torque, representing load, versus engine speed. It may be seen that with low torque conditions at all engine speeds the low pressure EGR loop is preferred. However, as the torque increases the "switching point" line is reached, wherein the high pressure EGR loop is preferred. In general, as the engine speed increases, the amount of torque required to preferably switch to the high pressure EGR loop is decreased. It may also be seen that under certain environmental conditions, such as condensation conditions, the preferred switching point at all speed settings is increased, such that switching to the high pressure EGR loop is delayed. Thus in FIG. 2 the dashed line represents a preferred switching point line when the engine is operated under condensation conditions, such as resulting from low ambient air temperatures. It may readily be seen that the parameters depicted on FIG. 2, such as torque and engine speed, may be detected by any of a variety of sensors, and that an ECU may be employed to determine the appropriate switching point under any given operating parameters.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An internal combustion engine system, comprising:

an internal combustion engine including an exhaust manifold with an exhaust outlet and an intake manifold with an air inlet;

an engine exhaust conduit in fluidic connection with the exhaust outlet and the inlet of a first control valve with one inlet and two outlets;

a high pressure exhaust gas recirculation (EGR) fluidic connection between a first outlet of the first control valve and the air inlet of the intake manifold;

an EGR cooler disposed along the high pressure EGR fluidic connection at a point downstream of the first control valve and upstream of the air inlet;

a turbocharger having an exhaust gas turbine with an input in fluidic connection with a second outlet of the first control valve and with an output, the turbocharger further having a compressor with an input and an output;

an EGR supply conduit in fluidic connection with the output of the exhaust gas turbine and a fresh air inlet in fluidic connection with the input of the compressor, with a second control valve disposed along the EGR supply conduit; and an intake manifold conduit in fluidic connection with the output of the compressor and the air inlet of the intake manifold.

2. The engine system of claim 1, further comprising a control, the control operating the first control valve and the second control valve to determine whether exhaust gas will enter the air inlet of the intake manifold by means of the high pressure EGR fluidic connection, by means of the intake manifold conduit, or by both.

3. The engine system of claim 2, further comprising at least one sensor, the at least one sensor sensing at least one operating parameter selected from the group consisting of the quantity of fuel flow to the engine, the engine speed of the engine, air flow at one or more points within the engine system, exhaust gas turbine speed, compressor pressure ratios, engine operating temperature, and air temperature.

4. The engine system of claim 1, further comprising an air cooler disposed along the intake manifold conduit at a point downstream of output of the compressor and upstream of the air inlet of the intake manifold.

5. The engine system of claim 1, wherein the turbocharger comprises a variable geometry turbocharger.

6. The engine system of claim 1, further comprising an EGR mixer with two inlets, providing a first inlet intake manifold conduit fluidic connection and a second inlet high pressure EGR fluidic connection, with the outlet in fluidic connection with the air inlet of the intake manifold.

7. The engine system of claim 6, wherein the EGR mixer comprises a proportioning gas control valve, to mix controlled proportions of the combined compressed air and exhaust gas from the intake manifold conduit with exhaust gas from the high pressure EGR fluidic connection.

8. The engine system of claim 1, further comprising an emissions controller with an input and output, the input of the emissions controller being in fluidic connection with the output of the exhaust gas turbine, and the output being in fluidic connection with the EGR supply conduit.

9. The engine system of claim 8, wherein the emissions controller comprise one or more of a diesel particulate filter, a diesel oxidation catalyst, a lean NOx trap, and a selective catalytic reduction catalyst.

10. A dual loop EGR system adapted for use with an internal combustion engine with an exhaust manifold including an exhaust outlet and an intake manifold including an air inlet, the system comprising:

a high pressure EGR loop in fluidic connection with the exhaust outlet of the exhaust manifold and the air inlet of the intake manifold;

an EGR cooler disposed along the high pressure EGR loop;

a turbocharger including an exhaust gas turbine and a compressor with an input and an output;

an exhaust emissions controller downstream of the exhaust gas turbine, with a first portion of a low pressure EGR loop in fluidic connection with the exhaust emissions controller and the input of the compressor; and a second portion of a low pressure EGR loop in fluidic connection with the output of the compressor and the air inlet of the intake manifold.

11. The dual loop EGR system of claim 10, further comprising a first control valve for controlling flow of exhaust through the high pressure EGR loop and a second control valve for controlling flow of exhaust through the first portion of the low pressure EGR loop.

12. The dual loop EGR system of claim 10, further comprising an air cooler disposed along the second portion of the low pressure EGR loop.

13. The dual loop EGR system of claim 11, further comprising a control, the control operating the first control valve and the second control valve.

14. The dual loop EGR system of claim 10, wherein the turbocharger comprises a variable geometry turbocharger.

15. A method for controlling EGR in an internal combustion engine with an exhaust manifold including an exhaust outlet and an intake manifold including an air inlet, the method comprising the steps of:

providing a high pressure EGR loop with an EGR cooler and a first control valve, the high pressure EGR loop being in fluidic connection with the exhaust outlet of the exhaust manifold and the air inlet of the intake manifold;

providing a turbocharger including an exhaust gas turbine with an exhaust emissions controller downstream of the turbine and a compressor with an input and an output;

providing a first portion of a low pressure EGR loop with a second control valve in fluidic connection with the exhaust emissions controller and the input of the compressor and a second portion of a low pressure EGR loop in fluidic connection with the output of the compressor and the air inlet of the intake manifold; and controlling the first control valve and the second control valve such that the EGR source is the high pressure EGR loop, the low pressure EGR loop, or a combination thereof.

16. The method of claim 15, wherein under low engine load conditions the primary source of EGR is the low pressure EGR loop and under high engine load conditions the primary source of EGR is the high pressure EGR loop.

17. The method of claim 15, wherein condensation within the engine is minimized under high condensation conditions by maintaining the low pressure EGR loop as the primary source of EGR at engine load conditions that exceed the engine load conditions at which the EGR source is switched from the low pressure EGR loop to the high pressure EGR loop during normal or low condensation conditions.

* * * * *